US012651233B2

(12) United States Patent
Benson et al.

(10) Patent No.: US 12,651,233 B2
(45) Date of Patent: Jun. 9, 2026

(54) DATABASE RECORD SIMILARITY MATCHING

(71) Applicant: Coupa Software Incorporated, San Mateo, CA (US)

(72) Inventors: Daniel Benson, San Clemente, CA (US); Mochen Liu, San Francisco, CA (US); Alison Guilbeaux-Brown, Atlanta, GA (US); Doug Benson, Burlingame, CA (US)

(73) Assignee: Coupa Software Incorporated, Foster City, CA (US)

( * ) Notice: Subject to any disclaimer, the term of this patent is extended or adjusted under 35 U.S.C. 154(b) by 361 days.

(21) Appl. No.: 18/191,844

(22) Filed: Mar. 28, 2023

(65) Prior Publication Data

US 2023/0351328 A1    Nov. 2, 2023

Related U.S. Application Data

(60) Provisional application No. 63/335,907, filed on Apr. 28, 2022.

(51) Int. Cl.
*G06Q 10/0875*        (2023.01)
*G06Q 10/0639*        (2023.01)

(52) U.S. Cl.
CPC ... *G06Q 10/0875* (2013.01); *G06Q 10/06395* (2013.01)

(58) Field of Classification Search
CPC ..................... G06Q 10/0875; G06Q 10/06395
See application file for complete search history.

(56) References Cited

U.S. PATENT DOCUMENTS

| | | | |
|---|---|---|---|
| 10,078,661 B1 * | 9/2018 | Roitman | ........... G06F 16/24578 |
| 2015/0142661 A1 | 5/2015 | Jain et al. | |
| 2018/0268448 A1 | 9/2018 | Simantov et al. | |
| 2020/0013098 A1 * | 1/2020 | Schnitt | .................. G06F 40/258 |
| 2020/0380455 A1 * | 12/2020 | Joy | ...................... G06Q 10/087 |

OTHER PUBLICATIONS

Boke, "The Most Used Methods to Deal with Missing Values", 2021, https://www.kaggle.com/code/kaanboke/the-most-used-methods-to-deal-with-missing-values (Year: 2021).*

* cited by examiner

*Primary Examiner* — Allen C Chein

(74) *Attorney, Agent, or Firm* — Baker Botts L.L.P.

(57)        ABSTRACT

In one embodiment, a method can access an expense line for a travel expense for an enterprise. The expense line is the subject of a procurement action under a relevant contract. The method can use a first machine learning model, determining a category associated with the expense line. The method can evaluate the expense line using the category associated with the expense line and a table of categories that are procurable with references to related travel contracts. The method can determine a match between a description field of the expense line and description fields of historic invoice records associated with travel contracts. In response to determining the match, the method can execute a responsive action for the expense line, wherein the responsive action includes generating a notification to a user, marking the expense line, and initiating a workflow to apply the contract to the expense line.

24 Claims, 11 Drawing Sheets

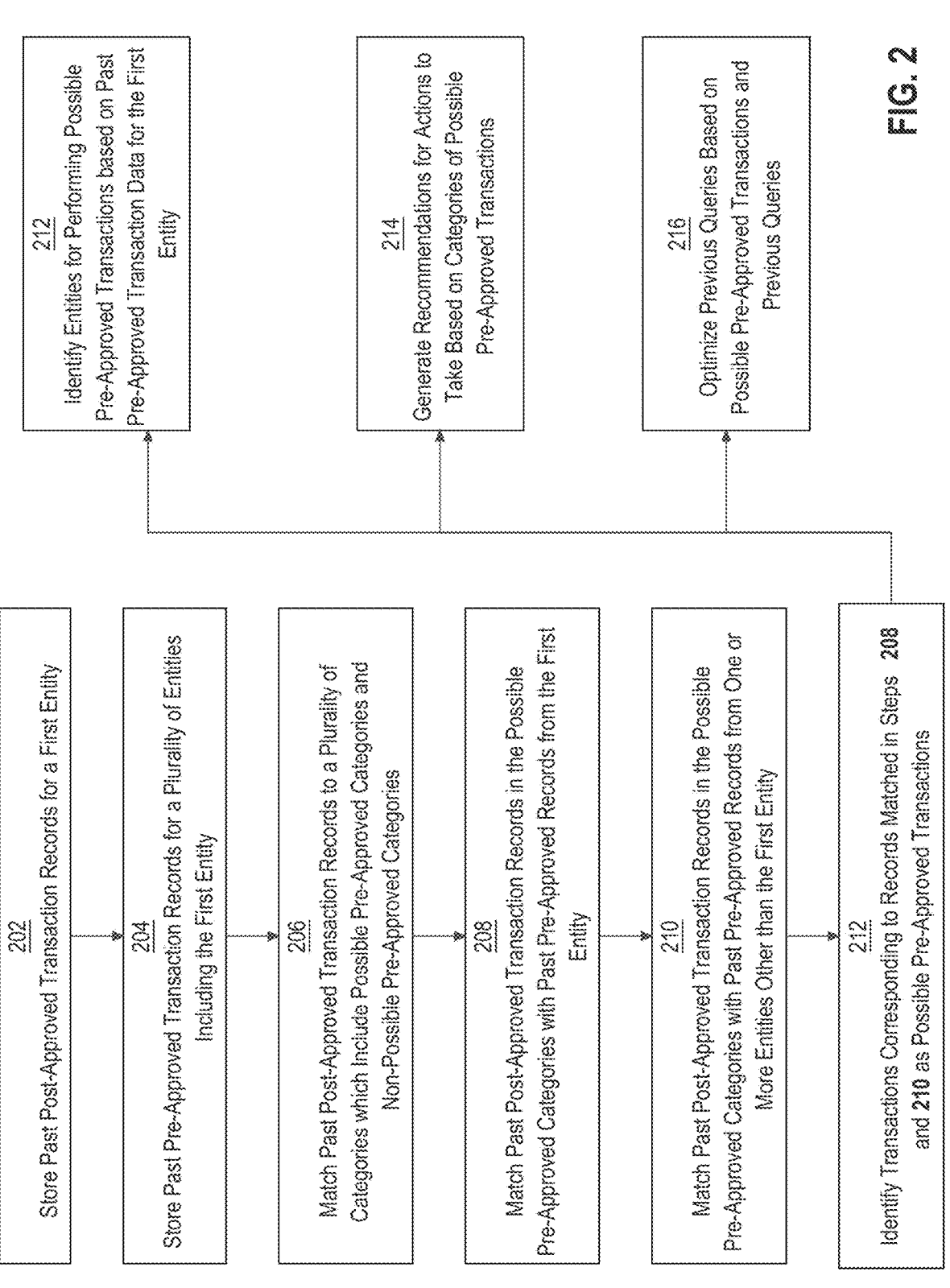

FIG. 2

202
Store Past Post-Approved Transaction Records for a First Entity

204
Store Past Pre-Approved Transaction Records for a Plurality of Entities Including the First Entity 206
Match Past Post-Approved Transaction Records to a Plurality of Categories which Include Possible Pre-Approved Categories and Non-Possible Pre-Approved Categories 208
Match Past Post-Approved Transaction Records in the Possible Pre-Approved Categories with Past Pre-Approved Records from the First Entity 210
Match Past Post-Approved Transaction Records in the Possible Pre-Approved Categories with Past Pre-Approved Records from One or More Entities Other than the First Entity 212
Identify Transactions Corresponding to Records Matched in Steps 208 and 210 as Possible Pre-Approved Transactions 212
Identify Entities for Performing Possible Pre-Approved Transactions based on Past Pre-Approved Transaction Data for the First Entity 214
Generate Recommendations for Actions to Take Based on Categories of Possible Pre-Approved Transactions 216
Optimize Previous Queries Based on Possible Pre-Approved Transactions and Previous Queries

Fig. 8

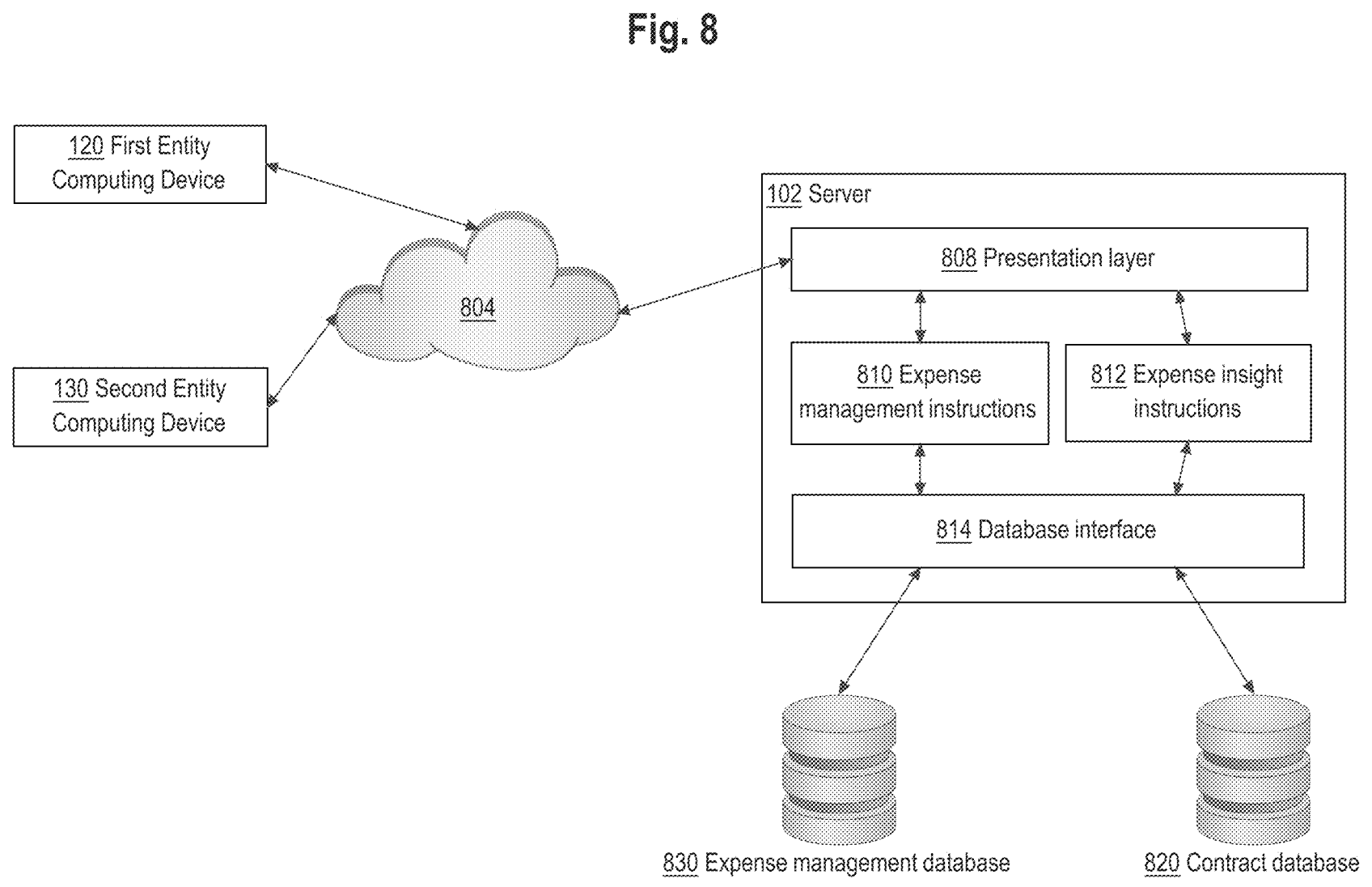

102 Server

808 Presentation layer

810 Expense management instructions

812 Expense insight instructions

814 Database interface

820 Contract database

830 Expense management database

804

120 First Entity Computing Device

130 Second Entity Computing Device

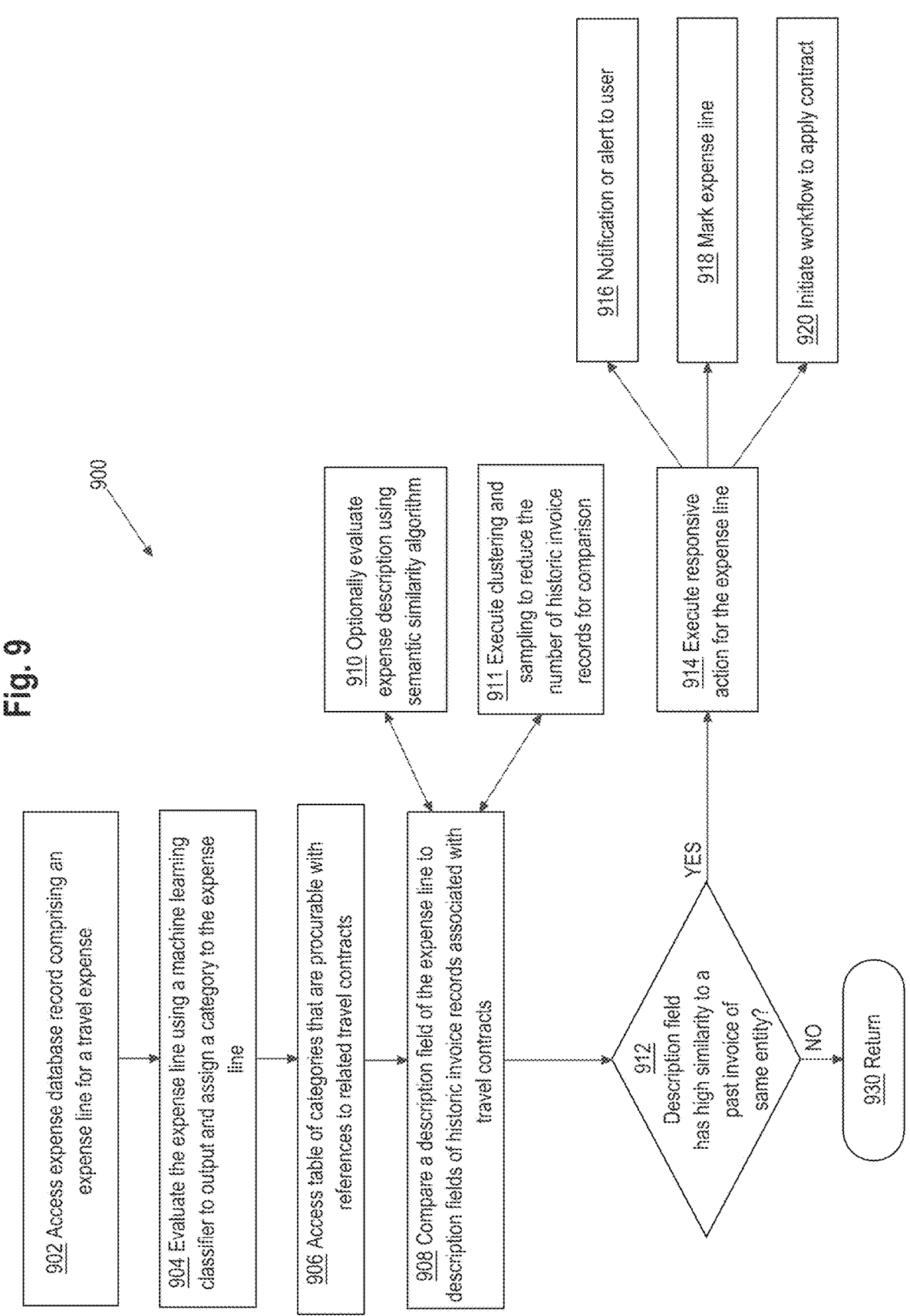

902 Access expense database record comprising an expense line for a travel expense 904 Evaluate the expense line using a machine learning classifier to output and assign a category to the expense line 906 Access table of categories that are procurable with references to related travel contracts 908 Compare a description field of the expense line to description fields of historic invoice records associated with travel contracts 910 Optionally evaluate expense description using semantic similarity algorithm 911 Execute clustering and sampling to reduce the number of historic invoice records for comparison 912 Description field has high similarity to a past invoice of same entity?

YES

NO

914 Execute responsive action for the expense line

916 Notification or alert to user

918 Mark expense line

920 Initiate workflow to apply contract

930 Return

DATABASE RECORD SIMILARITY MATCHING

BENEFIT CLAIM

This application claims the benefit under 35 U.S.C. § 119(e) of application 62/335,907, filed 28 Apr. 2022, the entire contents of which are hereby incorporated by reference for all purposes as if fully set forth herein.

COPYRIGHT NOTICE

TECHNICAL FIELD

One technical field of the present disclosure is relational database systems, including automated transformations of database records. Another technical field of the present disclosure is computer-implemented machine learning algorithms applied to compare transaction records. Another technical field is machine-implemented recommendation systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large entities, such as large companies or other organizations, often procure goods and services through a procurement system. A procurement system allows the large entities to procure items or services in bulk and/or through preferential contracts with goods and/or services providers. Through a procurement system, a large entity can specify preferred providers so that goods and/or services are obtained in an inexpensive and/or quality manner. Thus, it is often beneficial for large entities to obtain goods or services through a procurement system than it would be to have individuals purchase similar goods or services and request reimbursement for the expenses afterwards.

Unfortunately, despite utilizing procurement systems, many goods or services that could have been obtained through the procurement system are often obtained externally and submitted as expenses. While individual expenses may seem inconsequential, a large company which receives a large number of expense reimbursement requests can lose a lot in terms of quality of goods and/or services or cost when items are expensed instead of procured.

While it would be beneficial to be able to identify all submitted expenses that could have been procured, the identification of procurable expenses is a difficult problem when a large number of transactions are compared. This problem is exacerbated when procurements from the community are utilized in order to provide additional procurement opportunities that an entity as a whole is not utilizing.

Performing a transaction by transaction comparison can be computationally expensive and require a large amount of memory. As more records become available, more transactions can be identified as procurable, but at a higher cost in computing power and time to identify all such opportunities.

Thus, there is a need for a system which can match post-approved transaction records to other pre-approved transaction records with high accuracy but low computational cost or memory requirements. More specifically, there is a need for a system which reduces the number of operations required by the server computer while still obtaining similar results.

Digital relational databases now are widely used to store, manage, and control the flow of information in business enterprises, with integration into a variety of practical applications. One example application is employee expense management. In many business enterprises, employees or contractors incur external expenses in the course and scope of employment, and are entitled to reimbursement, from the enterprise, for those expenses. To manage the collection, review, and approval of expense information, enterprises use expense management software, linked to relational databases.

Travel costs are a significant portion of employee expenses for some enterprises and their employees. Business travel can involve costs of thousands of dollars per trip and hundreds of thousands of dollars per employee per year. Therefore, to manage the creation or collection, review, and approval of travel expense information, enterprises use travel expense management software, linked to relational databases. In some cases, but not all, general expense management is linked to travel management.

Some enterprises enter into long-term cost control contracts with travel service providers. For example, enterprises may have volume discount contracts with airlines, rental car companies, hotel operators or chains, and restaurant operators or chains. Because of the volume and complexity of these contracts, relational databases also can be used to create, manage, and distribute information about records of contracts.

Many data elements relevant to travel spending, expenses spending, and contracts information are the same. Computing functions, approval chain functions, and human-computer interface functions for travel spending, expenses spending, and contracts administration often are the same, or have substantial crossover, yet each is managed using different software platforms and databases in most cases today. Companies have tried to connect this data with little success because of problems accessing all different types of data in one platform. Consequently, business travel managers can be forced to make decisions based on partial data, or to spend hours trying to piece together information from various sources. There is an acute, unfulfilled need in the field for ways to automatically transfer relevant data among systems, automatically update data in different records of different systems, or otherwise integrate the functions described above.

SUMMARY

The appended claims may serve as a summary of the invention.

BRIEF DESCRIPTION OF THE DRAWINGS

In the drawings:

FIG. 2 is a flow diagram depicting an example method for identifying past post-approved transactions as possible pre-approved transactions.

FIG. 8 is a block diagram that illustrates an example distributed computing system with which an embodiment can be implemented.

FIG. 9 is a flow diagram of a computer-implemented process or algorithm that can be programmed to implement an embodiment.

DETAILED DESCRIPTION

Figure 1:
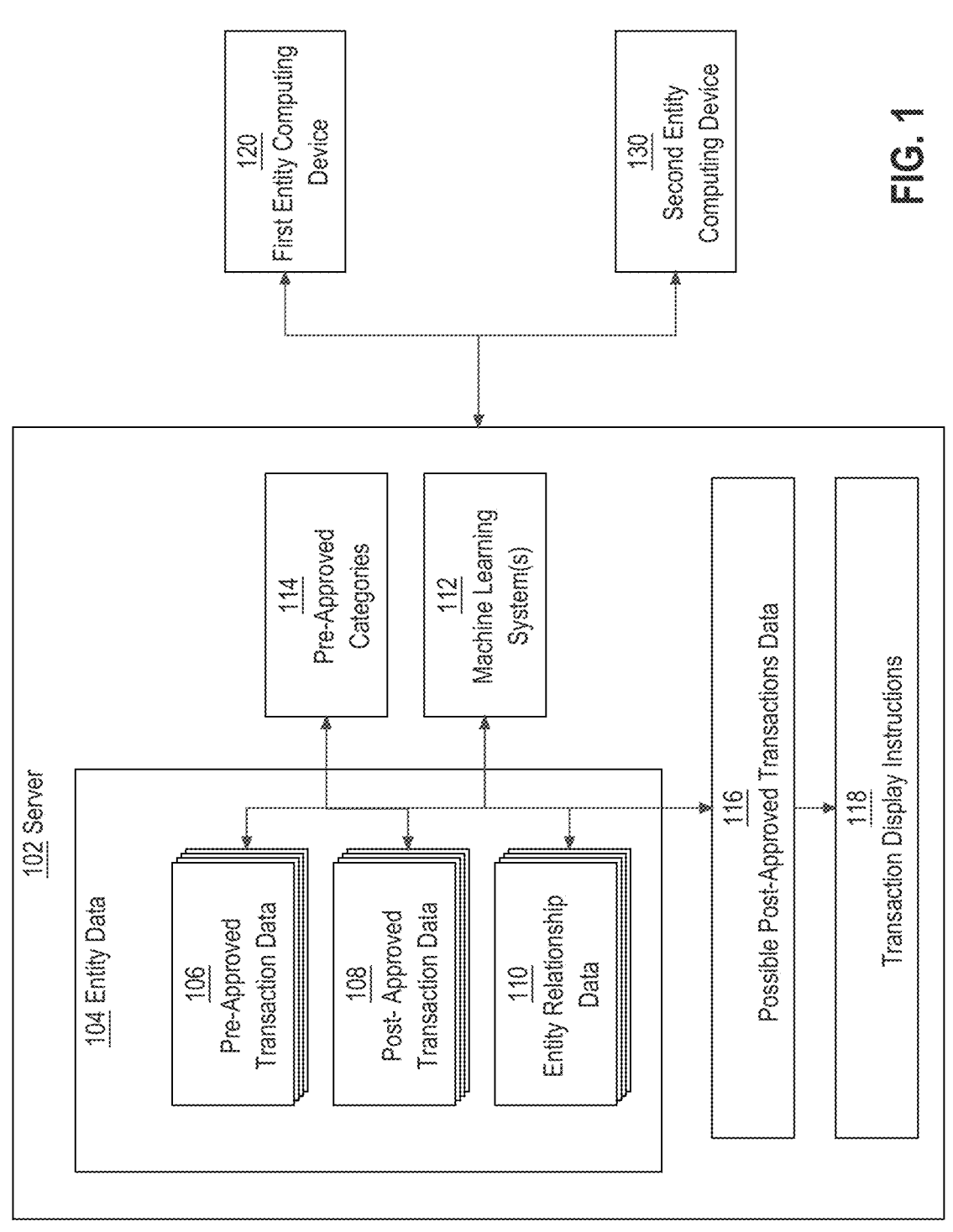
FIG. 1 is a block diagram of an example computer network system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

In an embodiment, a server computer stores expense records which identify past post-approved transactions and invoice records from a procurement system which identify past pre-approved transactions. For a particular entity, the server normalizes the expense records to a plurality of categories that have been identified as procurable or not procurable categories. For expense records that were normalized to a procurable category, the server then compares the expense records to invoice records of the particular entity. Any remaining expense records that were normalized to a procurable category but not matched to invoice records of the particular entity are then compared to invoice records of other entities. The server identifies transactions corresponding to the matched records as procurable and causes display of information identifying past expense transactions as procurable based on the particular entity's records and as procurable based on entity records of other entities.

In an embodiment, a method comprises storing a first plurality of digital electronic records for a first entity, the first plurality of digital electronic records identifying a plurality of past post-approved transactions by the first entity; storing a second plurality of digital electronic records for the first entity, the second plurality of digital electronic records identifying a plurality of past pre-approved transactions by the first entity; using a first machine learning system, determining that a subset of the first plurality of digital electronic records which identify a subset of the plurality of past post-approved transactions correspond to one or more pre-identified categories; using a second machine learning system, matching one or more particular digital electronic records of the subset of the first plurality of digital electronic records with one or more records of the second plurality of digital electronic records; causing displaying, on a client computing device, digital electronic data identifying transactions corresponding to the one or more particular digital electronic records as potential pre-approved transactions.

Systems and methods for improving a computing system comparing past post-approved travel service transaction records to past pre-approved travel service transaction records are described herein. In an embodiment, a server stores a first plurality of digital electronic records identifying a plurality of past post-approved travel service transactions by a first entity and a second plurality of digital electronic records for the first entity identifying a plurality of past pre-approved travel service transactions by the first entity. The server uses a first machine learning system to determine that a subset of the first plurality of digital electronic records which identify a subset of the plurality of past post-approved travel service transactions correspond to one or more pre-identified categories and a second machine learning system to match one or more particular digital electronic records of the subset of the first plurality of digital electronic records with one or more records of the second plurality of digital electronic records. Embodiments can automatically determine when expense lines for travel service items in an expense report should have been procured under an enterprise contract rather than purchased as an individual employee expense.

In this context, expenses are submitted after the item or service has already been purchased and therefore can be termed "post-approved." A procured item or service goes through a procurement process where suppliers are identified, negotiated with, and possibly even subject to an RFP; these transactions can be termed "pre-approved." Investigation of the inventors has shown that about 10% to 15% of post-approved spend represents commodities or services that entities or enterprises or the community had procured in the past. Identifying that spend can help users reduce costs by causing users to submit orders instead of expenses and get the item at pre-negotiated, contracted, and discounted prices. While certain embodiments have been developed based upon achieving the foregoing, embodiments also address the technical problem of how to efficiently identify, in databases having millions of records, expense lines that match contract terms, contracted services, or contracted commodities despite having different descriptions in the digitally stored data of a record. Expense lines can represent travel expenses or other kinds of expenses.

2. Structural & Functional Overview

FIG. 1 is a block diagram of an example computer network system in which various embodiments may be practiced. In an embodiment, a computer system of FIG. 1 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 is shown in simplified, schematic format for purposes of illustrating a clear example and other embodiments may include other elements. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a networked computer system comprises a server computer ("server" for short) 102, first entity computing device 120 and second entity computing device 130, which are communicatively coupled directly or indirectly via one or more networks. The server 120, entity computers 120 and 130 and other elements of the system may each comprise an interface compatible with the one or more networks and are programmed or configured to use standardized protocols for communication across the networks such as TCP/IP, Bluetooth, and higher-layer protocols such as HTTP, TLS, and the like.

Server 102 may be implemented using a server-class computer or other computers having one or more processor cores, co-processors, or other computers. Server 102 may be a physical server computer and/or a virtual server instance stored in a data center, such as through cloud computing.

Server 102 stores entity data 104, pre-approved categories 114, one or more machine learning system(s) 112, possible post-approved transactions data 116, and transaction display instructions 118. Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 102.

Entity data 104 comprises pre-approved transaction data 106, post-approved transaction data 108, and entity relationship data 110. The entity data 104 may be stored as individual records, such as pre-approved transaction records and post-approved transaction records, and/or as elements in a transactional database. While FIG. 1 depicts the records being stored in the server 102, the records may be stored in an external system, such as an external physical server and/or cloud server, and accessed by server 102.

Pre-approved transaction data 106 comprises one or more transaction records that have been defined as pre-approved transactions. For example, transactions executed through a procurement interface may be identified as pre-approved transactions. Post-approved transaction data 108 comprises one or more transaction records that have been defined as post-approved transactions. For example, transactions that are submitted for expense reimbursement may be identified as post-approved transactions. The transaction records may include one or more structured data fields and/or one or more unstructured data fields. Example of data fields comprise entity-defined categories, transaction amount, transaction location, transaction description, transaction date, merchant identifier, and/or other structured or non-structured fields provided by an interface for submitting procurement requests and/or expenses for reimbursement.

Relationship data 110 comprises one or more records defining relationships between a procuring entity and a providing entity. For example, the server 102 may store data identifying one or more contracts between a procuring entity and a providing entity which specify one or more products or services that are provided by the providing entity for procurement by the procuring entity. Additionally or alternatively, the server 102 may store data identifying that one or more contracts exist between the procuring entity and the providing entity without specifying the items provided for procurement.

Machine learning system(s) 112 comprise one or more machine learning models which are used to group post-approved transaction records into pre-approved categories, match pre-approved transaction records with post-approved transaction records, and/or group post-approved transaction records into one or more clusters. Example machine learning systems comprise logistic regression, random forest, decision tree learning, association rule learning, artificial neural network, support vector machines, and/or Bayesian networks. As a practical example, a term frequency-inverse document frequency model (TF-IDF) may be utilized in conjunction with a logistic regression machine learning system to categorize post-approved transaction records. As another example, a normalization system such a fuzzy matching machine learning system may be used to normalize unstructured data fields in a plurality of records.

In an embodiment, one or more machine learning system(s) 112 are used to categorize post-approved transactions into a plurality of categories. The plurality of categories may comprise categories designated as pre-approved categories 114 and/or categories designated as not pre-approved categories. One or more post-approved transactions that are categorized as pre-approved categories 114 may then be matched with pre-approved transaction records to create possible post-approved transactions data 116.

In an embodiment, the server 102 executes transaction display instructions 118. The server 102 may also be executing additional code, such as code for the machine learning system(s) 112, code for an expense system, and/or code for a procurement system. The server 102 may generate and transmit alerts, notifications, recommendations, graphical user interfaces, and other information through the transaction display instructions. For example, the transaction display instructions may be a set of instructions within a software-as-a-service (SaaS) application that the first entity computing device 120 and/or second entity computing device 130 accesses using a web browser hosted at the computing device.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 102.

The server 102 is accessible over a network by multiple computing devices, such as entity computing device 120 and/or second entity computing device 130. Although FIG. 1 depicts only one computing device per entity, any number of other computing devices may be registered with server 102 at any given time. Thus, the elements in FIG. 1 are intended to represent one workable embodiment but are not intended to constrain or limit the number of elements that could be used in other embodiments. In an embodiment, the first entity computing device 120 may comprise a plurality of computing devices that are restricted to only users from a single entity. In other words, although more than one computer may be used, only verified users of a single entity may access specific transaction records stored in the server 102 from these computers. Any applicable means of restricting unauthorized users from accessing specific records and/ or information stored on the server 102 may be used (for example, password and username, two-step authentication, or other means).

The computing devices such as the first entity computing device 120 and/or second entity computing device 130 may comprise computers that include hardware capable of communicatively coupling the computers to one or more server computers, such as server computer 102 over one or more service providers. For example, first entity computing device 120 and/or second entity computing device 130 may include a network card that communicates with server computer 102 through home or office wireless routers (not illustrated in FIG. 1) coupled to an internet service provider. The first entity computing device 120 and/or second entity computing device 130 may be any of smart phones, personal computers, tablet computing devices, PDAs, laptops, or any other computing devices capable of transmitting and receiving information and performing the functions described herein.

One or more networks (not shown) may be implemented by any medium or mechanism that provides for the exchange of data between the various elements of FIG. 1. Examples of the one or more networks include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. The one or more networks may comprise one or more local area networks, wide area networks, and/or internetworks. The various elements of FIG. 1 may also have direct (wired or wireless) communications links, depending upon a particular implementation.

2.1 Stored Transaction Data

FIG. 2 is a flow diagram depicting an example method for identifying past post-approved transactions as possible pre-approved transactions. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

At step 202, past post-approved transaction records are stored for a first entity. For example, a management computer system may store an entity profile that identifies an entity which has access to software provided by the management computer system, such as a software-as-a-service (SaaS) application. The first entity may be an organizational grouping which includes a plurality of individual accounts. For example, an entity may refer to a business with individual employees of the business maintaining individual accounts. Thus, while the management computer system maintains a plurality of first accounts, the plurality of first accounts comprise accounts that belong to the first entity.

In an embodiment, the first entity has access to a management computer system programmed with options for performing a plurality of tasks. For example, the SaaS application provided by the management computer system may include options for performing various tasks. The various tasks may include approval tasks, such as approving expense reports, sourcing tasks, such as procurement transactions between different computing devices, reviewing tasks, such as reviewing contracts or other documents, and/or document generation tasks, such as generation of expense reports and invoices. The above listed tasks are intended as examples and the plurality of tasks may differ depending on the type of options presented by the management computer system.

The server 102 may store post-approved transaction records for a plurality of entities. A post-approved transaction, as used herein, refers to a transaction that is approved after the performance of a transaction through a post-approved transaction record. For example, expense transactions may be reimbursed through expense reimbursement requests submitted to the server 102 from the first entity computing device 120. The post-approved transaction records may include a plurality of structured and/or unstructured data fields, such as an expense number, categories defined by the first entity, merchant identification, transaction amount, location, description, reason, transaction date, reimbursement request submitter, and/or reimbursement request approver. Unstructured data fields, as used herein, refers to data fields which accept unstructured data, such as a description field which accepts string input. Structured data fields, as used herein, refers to data fields which accept structured data, such as a transaction date field which accepts date input in one or more specific formats.

At step 204, past pre-approved transaction records are stored for a plurality of entities including the first entity. A pre-approved transaction, as used herein, refers to a transaction that is approved prior to the performance of the transaction. For example, procurement from contracted providers and/or through a procurement system of one or more goods or services may be pre-approved such that a representative of the first entity may perform the transaction on behalf of the entity. The pre-approved transactions may correspond to pre-approved transaction records, such as invoices for procured items. The pre-approved transaction records may also include a plurality of structured and/or unstructured data fields, such as categories defined by the first entity, merchant information, transaction amount, location, description, transaction date, and/or procuring user.

In an embodiment, the server 102 additionally stores data relating to one or more provider entities. For example, the server 102 may provide a procurement system in which provider entities make goods and/or services available for procurement. The server 102 may store data identifying past transactions of the provider entities, such as goods or services provided, costs per unit, transaction dates, transaction amounts, transaction dates, and/or other data relating to past transactions of the provider entity through the procurement system. Additionally or alternatively, the server 102 may store data records identifying goods or services generally made available by one or more provider entities. For example, the server 102 may store a catalog of goods or services for a provider entity with corresponding information, such as descriptions or costs In an embodiment, the server 102 stores relationship data identifying relationships between provider entities and other entities. For example, the server 102 may store data that identifies a contract between a first entity and a specific provider entity. The relationship data may range in breadth from merely identifying the specific entities to identifying terms of the relationship, such as types of goods or services provided by the provider entity, amounts in which the goods or services are to be provided, costs or discounts, and/or any other terms of the relationship between the two entities.

2.2 Category Matching

At step 206, past post-approved transaction records are matched to a plurality of categories which include possible pre-approved categories and non-possible pre-approved categories. For example, a plurality of categories may be defined as outputs in training data for a machine learning system. Examples of categories include procurement, office supplies, internet, phone, dues/membership/subscriptions, employee training, entertainment, meals, gifts, rental car, airfare, and lodging. In an embodiment, the plurality of categories to which the records are matched may differ from the entity defined categories. For example, an entity may define its own categories for identifying transactions that overlap, partially overlap, or do not overlap with the matching categories. Thus, while matching the records to categories may incorporate entity-defined category data, the transaction record's initial category may not be dispositive in matching the transaction record to one of the plurality of categories.

Some of the categories may be defined as possible pre-approved categories. For example, procurement, office supplies, internet, dues/membership/subscription, and employee training may be defined as possibly procurable expenses while entertainment, meals, gifts, rental car, airfare, and lodging may be defined as non-possible pre-approved categories.

Server 102 may use a machine learning system trained to normalize transactions into the plurality of predefined categories. For example, the machine learning system may be trained using expense lines as inputs with the normalized categories as outputs. As a practical example, the server 102 may train a TF-IDF model using logistic regression where the training datasets comprise expense records that have been previously matched to normalized categories, the inputs comprise one or more fields of the transaction records, and the outputs comprise each normalized category.

By normalizing transactions to a plurality of pre-defined categories, the methods increase the efficiency at which the server 102 is able to process large amounts of data to determine which previous post-approved transactions could be identified as possible pre-approved transactions. Specifically, the normalizing techniques described herein allow the server 102 to prune transaction records from future matching steps if the transaction records are not normalized to one of the categories defined as possible pre-approved categories. Thus, the server 102 is able to perform the methods described herein with a large number of transaction records at faster speeds and using less processing power as particular records are removed prior to the matching steps based on the normalization.

2.3 Pre-Approved Transaction Matching

At step 208, past post-approved transaction records in the possible pre-approved categories are matched with past pre-approved records from the first entity. For example, the server 102 may compare past post-approved transaction records that have been normalized to one of the possible pre-approved categories with past pre-approved transaction records based on one or more fields of the transaction records.

In an embodiment, the server 102 converts one or more fields of each past post-approved transaction and one or more fields of the past pre-approved transaction records into one or more vectors using one or more machine learning systems. For example, the Word2vec machine learning algorithm may be used to convert words in a description field and/or a reason field of the transaction records into one or more vectors.

Given possible differences in nature of post-approved transaction records from pre-approved transaction records, the selected fields for conversion into vectors may differ. For example, the server 102 may convert a description field and a reason field from the past post-approved transaction records into a vector but only the description field from the past pre-approved transaction records. Other example embodiments may include merchant fields, category fields, or item identifier fields that additionally or alternatively are used to generate a vector for one or more of the past post-approved transaction records or past pre-approved transaction records.

In an embodiment, the server 102 uses a machine learning system to compare vectors generated from the past post-approved transaction records of the first entity with vectors generated from the past pre-approved transaction records of the first entity. For instance, for each past post-approved transaction record, the server 102 may compute a cosine similarity between the vector corresponding to the past post-approved transaction record and the vectors corresponding to each past pre-approved transaction record until a match is identified and/or all past vectors corresponding to past pre-approved transaction records have been compared to the vector of the past post-approved transaction record. In an embodiment, the server 102 identifies a match if the cosine similarity between two vectors is greater than a threshold value, such as 70%.

By initially comparing past post-approved transaction records with past pre-approved transaction records of the same entity, the system is able to reduce the number of comparisons that need to be made to match records. For example, each past post-approved transaction record that has been matched with a past pre-approved transaction record may be set aside as matched records. Step 210 may then proceed with the remaining unmatched records. Given that the number of records for past pre-approved transactions for other users often far exceeds the number of records for past pre-approved transactions for a single user, this initial step reduces the amount of processing that needs to be performed substantially by removing post-approved transaction records which can be matched to pre-approved transaction records of the first entity.

At step 210, past post-approved transaction records in the possible pre-approved categories are matched with past pre-approved transaction records from one or more entities other than the first entity. For example, the server 102 may use the Word2vec machine learning algorithm to generate vectors for past pre-approved transaction records of other users of a procurement system provided by server 102, thereby allowing for records to be compared across a plurality of entities. The server 102 may compare vectors corresponding to post-approved transaction records of the first entity that were not matched in step 208 with vectors corresponding to past pre-approved transactions of the other users of the procurement system, such as by computing a cosine similarity between the vectors and determining that the vectors match if the cosine similarity is greater than a threshold value, such as 70%.

In an embodiment, the server 102 further reduces the processing power and time required to match past post-approved transaction records of a first entity with past pre-approved transaction records of a plurality of other entities by intelligently reducing the number of past pre-approved transaction records of the plurality of other entities while keeping high information fidelity. For example, server 102 may utilize a clustering algorithm, such as the K Means clustering algorithm, to cluster the pre-approved transaction records of the plurality of other entities into a plurality of clusters. The server 102 may then select, randomly or pseudo-randomly, a subset of the past pre-approved transaction records in each cluster to compare to the past post-approved transaction records. For example, the server 102 may select 10% of the records in each cluster for comparison. The number of clusters may be predetermined, such as fifty clusters, and/or determined based on the number of pre-approved transaction records for comparison, such as one cluster per thousand records.

By clustering the vectorized past pre-approved transaction records of the plurality of other entities, the server 102 is able to compute the comparison between past post-approved transaction records of the first entity and the past pre-approved transaction records of a plurality of second entities much faster. For example, computation time may be reduced by as much as 90% while producing an equivalent number of matches for the post-approved transaction records by clustering the past pre-approved transaction records and selecting a subset of each cluster for comparison.

At step 212, transactions corresponding to records matched in steps 208 and 210 are identified as possible pre-approved transactions. For example, the server 102 may identify expense transaction records that were matched to invoices in step 208 as procurable based on the first entity's information and expense transaction records that were matched to invoices of others in step 210 as procurable based on entity information other than for the first entity.

While FIG. 2 depicts both steps 208 and 210 being performed, in an embodiment either step 208 or step 210 can be performed without the other. For example, server 102 may only compare past post-approved transaction records with pre-approved transaction records of the first entity or may broadly compare post-approved transaction records of the first entity to pre-approved transaction records of a plurality of other entities, including or excluding the first entity, without first comparing the post-approved transaction records to pre-approved transaction records of the first entity.

In an embodiment, the server 102 causes display of a graphical user interface which identifies past post-approved transaction records as possible pre-approved transactions. For instance, the server 102 may display a percentage of previous post-approved transactions that are potential pre-approved transactions based on the first entities data, that are potential pre-approved transactions based on the other entities' data, and/or that are not potential pre-approved transactions. Example graphical user interfaces for identifying past post-approved transaction records as possible pre-approved transactions are described further herein.

In addition to displaying information relating to past post-approved transaction records that have been identified as possible pre-approved transaction records, the systems and methods may utilize the systems and methods described herein to perform one or more of optional steps 212, 214, and/or 216.

2.4 Identifying Entities

In an embodiment, at step 212, entities are identified for performing possible pre-approved transactions based on past pre-approved transaction data for the first entity. For example, the server 102 may identify a provider entity for each past pre-approved transaction that has been matched to a post-approved transaction. Identifying the entity may comprise determining the entity from a "merchant" field in the record and/or from stored data regarding the transaction between two entities.

The server 102 may determine, for each of the possible pre-approved transactions that are based on past pre-approved transaction data for the first entity, one or more entities capable of performing the pre-approved transactions. The server 102 may further aggregate identifications of the one or more entities. For example, the server 102 may determine a number of possible pre-approved transactions that could be performed through each of the one or more entities and/or a total dollar amount corresponding to transactions that could be performed through each of the one or more entities. Server 102 may aggregate dollar amounts from the "amount" fields in the past post-approved transaction records corresponding to the possible pre-approved transactions.

In an embodiment, the server 102 calculates an amount of savings of switching to the possible pre-approved transactions from the post-approved transaction records. For instance, for each record matched past post-approved transaction record of the first entity, the server 102 may identify a merchant for the corresponding past pre-approved transaction record, a total amount for a particular item, and the total amount for the particular item in the matching past pre-approved transaction record. The server 102 may compute a difference between the total amount in the past post-approved transaction record and the total amount in the past pre-approved transaction record. The server 102 may then increment a savings value for the merchant by the computed difference. In an embodiment, the server 102 causes display of the savings value for the merchant and/or an overall savings value for utilizing the merchant for possible pre-approved transaction records instead of post-approved transaction records.

2.5 Generating Recommendations

In an embodiment, at step 214, the server 102 generates recommendations for actions to take based on categories of possible pre-approved transactions. For example, the server 102 may store one or more recommendations for each of the plurality of pre-defined categories identified as possible pre-approved transaction records. The server 102 may be programmed or configured to provide recommendations for a particular category when past post-approved transactions that have been normalized to the particular category are matched with past pre-approved transactions. Thus, the server 102 is able to provide recommendations based on the normalized categories in addition to the matching data.

In an embodiment, the server 102 displays recommendations in a graphical user interface which displays data for first entity-defined categories. The server 102 may identify transactions within the first entity-defined categories that have been matched to past pre-approved transaction records. For the matched transactions, the server 102 may identify a normalized category for the transaction and display a recommendation based on the normalized category. Thus, the first entity-defined categories may include recommendations from a plurality of normalized categories.

In an embodiment, the server 102 ranks recommendations by a number of transactions that were normalized to a category corresponding to the recommendation and/or a total amount in transactions that were normalized to a category corresponding to the recommendation. For example, if a customer-defined category of "overhead" includes ten transactions that were normalized to the "Office Supplies" category and three transactions that were normalized to the "Internet" category, the recommendations for the "Office Supplies" category may be displayed ahead of and/or in place of the recommendations for the "Internet" category. Additionally and/or alternatively, if the three transactions normalized to the "Internet" category corresponded to a total of $5,000 while the ten transactions normalized to the "Office Supplies" category corresponded to $500, then the recommendations for the "Internet" category may be displayed ahead of and/or in place of the recommendations for the "Office Supplies" category.

2.6 Query Optimization

In an embodiment, at step 216, previous queries are optimized based on possible pre-approved transactions and previous queries. For example, the server 102 may identify, for a particular post-approved transaction record that was matched to a pre-approved transaction records, one or more queries through the procurement system that correspond to the particular post-approved transaction. For example, the server 102 may store queries made by the first entity through a procurement system with data identifying the date and/or time of the queries. The server 102 may identify a date of the particular post-approved transaction record and select a subset of queries made by the first entity that are within a specific time period prior to the post-approved transaction. The server 102 may then compute a similarity value between the vectorized description for the particular post-approved transaction record and vectorized versions of the subset of the queries. If the cosine similarity between a query and the post-approved transaction record is greater than a threshold value, such as 70%, the server 102 may determine that the query corresponds to the post-approved transaction record.

With a query matched to a past post-approved transaction record, the server 102 may identify one or more optimized queries. For example, the server 102 may identify a merchant and/or item in the past pre-approved transaction record that corresponds to the past post-approved transaction record and determine whether the initial query would result in the merchant and/or item. If the initial query would not result in the merchant and/or item, the server 102 may modify the query such that the merchant and/or item would be a result of the query, such as modifying one or more words in the query to match one or more words in the description of the merchant and/or item. The server 102 may then store the optimized query with data corresponding the optimized query to the one or more initial queries.

In an embodiment, in response to receiving a query that matched the one or more initial queries, the server 102 may display a recommendation to replace the query with the stored optimized query. For example, the server 102 may compare future queries received by the first entity with the one or more initial queries using any known linguistic comparison techniques. If a future query matches the initial query, the server 102 may display a notification identifying the optimized query as a possible alternative to the future query.

2.7 Contract Matching

In an embodiment, the server 102 matches past post-approved transaction records to relationship data stored in server 102 defining relationships between the first entity and one or more other entities. For example, the server 102 may store contract data identifying an agreement between a particular provider entity and the first entity for the particular provider entity to provide one or more goods and/or services to the first entity.

In an embodiment, the server 102 matches any post approved-transaction records that have been normalized into one of the possible pre-approved transaction records categories to one or items and/or services provided by the one or more other entities. For example, the server 102 may first identify the one or more other entities with which the first entity has a relationship based on the stored relationship data. The server 102 may then compare vectorized past post-approved transaction records to vectorized descriptions of items and/or services of the one or more other entities from stored catalog data for the one or more other entities.

Additionally or alternatively, the server 102 may compare the vectorized past post-approved transaction records to past pre-approved transaction records corresponding to the one or more other entities. For example, after categorizing the post-approved transaction records into the possible pre-approved transaction records categories, the server 102 may initially perform the comparisons described herein with respect to records corresponding to the one or more other entities.

As a practical example, if the first entity has a relationship with a particular second entity, the server 102 may first compare the past post-approved transaction records with past pre-approved transaction records between the first entity and the particular second entity, followed by comparing them with all other past pre-approved transaction records of the first entity, followed by comparing them with past pre-approved transaction records between any other entities and the particular second entity, followed by comparing them with past pre-approved transaction records of entities other than the first entity and the particular second entity.

If the server 102 matches the past post-approved transaction records to a transaction record corresponding to a particular second entity with which the first entity has a relationship defined by stored entity relationship data, the server 102 may additionally recommend utilizing the particular second entity for future transactions. Additionally or alternatively, the server 102 may aggregate records that are matched to the particular second entity to identify a number of past post-approved transactions and/or a total cost of past post-approved transactions that could have been performed as past pre-approved transactions through the particular second entity.

2.8 Example Graphical User Interface

In an embodiment, the server 102 provides a graphical user interface for depicting past post-approved transaction records that have been matched to past pre-approved transaction records. The graphical user interface may identify aggregated values, such as a total cost of past post-approved transactions over a particular period of time that have been categorized as possible pre-approved transactions based on records of the first entity and/or based on records of a plurality of second entities.

Figure 3:
FIG. 3 depicts an example graphical user interface for displaying information relating to past post-approved transaction records that have been identified as possible pre-approved transactions.

FIG. 3 depicts an example graphical user interface for displaying information relating to past post-approved transaction records that have been identified as possible pre-approved transactions. Interface 300 comprises total expense 302 and total procurable 304. Total expense comprises a total cost of past post-approved transaction records. Total procurable 304 comprises a total cost of the subset of past post-approved transaction records that have been matched to past pre-approved transaction records.

FIG. 3 further comprises expense category graph 306. Expense category graph 306 comprises a breakdown of past post-approved transaction records by expense categories 308. The expense categories 308 comprise a breakdown of past post-approved transaction records by user defined categories. For example, each past post-approved transaction record may comprise data identifying a user defined category to which the record corresponds. Expense category graph 306 thus provides data indicating, for each user defined category, a total cost of the past post-approved transaction records for the category over a specific period of time, wherein a first portion of the graph identifies a total cost of past post-approved transaction records which have been matched to past pre-approved transaction records of the same entity, a second portion of the graph identifies a total cost of past post-approved transaction records which have been matched to past pre-approved transactions records of one or more other entities, and a third portion identifies a total cost of past post-approved transaction records that were not matched to past pre-approved transaction records.

The expense category graph 306 provides a unique graphical user interface wherein procurement opportunities are depicted in a streamlined and convenient manner. In an embodiment, the expense category 306 is configured to provide additional precise information in response to one or more user controls. For example, in response to detecting that a user's cursor has been moved to a portion of the graph, the server 102 may be configured to cause displaying of an exact cost amount corresponding to the portion of the graph. For example, if you user moves a cursor over the "Procurable by You" section of the "Office Supplies" category in FIG. 3, the server 102 may cause display of a window with text identifying the category as "Office Supplies", the portion as "Procurable by You", and the total amount for the portion of the graph as "36,538".

Figure 4:
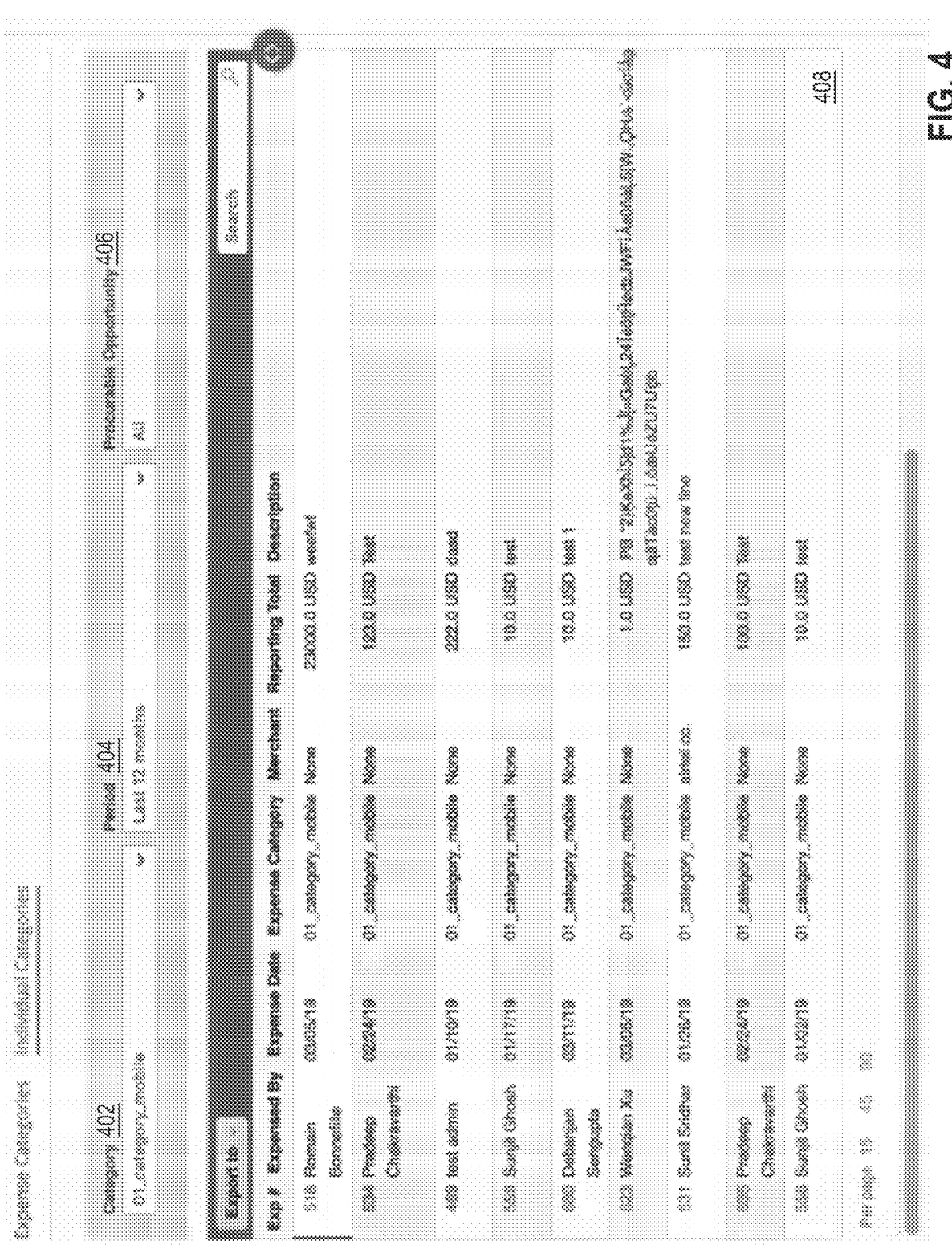
FIG. 4 depicts an example graphical user interface for displaying more detailed information regarding transaction records in a particular category.

In an embodiment, the graphical user interface is configured to display additional transaction information in response to receiving a selection of a particular category. FIG. 4 depicts an example graphical user interface for displaying more detailed information regarding transaction records in a particular category. Interface 400 comprises individual record data 402 for a particular category 404. In an embodiment, the particular category 404 option can be selected to cause the graphical user interface to display data for a different category. The period 406 comprises controls for selecting a time period for viewing transaction records, such as reviewing records from the past 12 months, 6 months, 1 month, etc. Procurable opportunity 408 comprises controls for selecting a view of based on whether they were matched to past pre-approved transactions of the same entity and/or other entities.

Interface 400 identifies, for each past post-approved transaction record, a date of the record, a submitter of the record, a category of the record, a cost of the record, a merchant for the record, and a description of the record. In an embodiment, the interface 400 additionally identifies whether the record was identified as procurable based on records from the viewing entity or based on records from one or more other entities.

Figure 5:
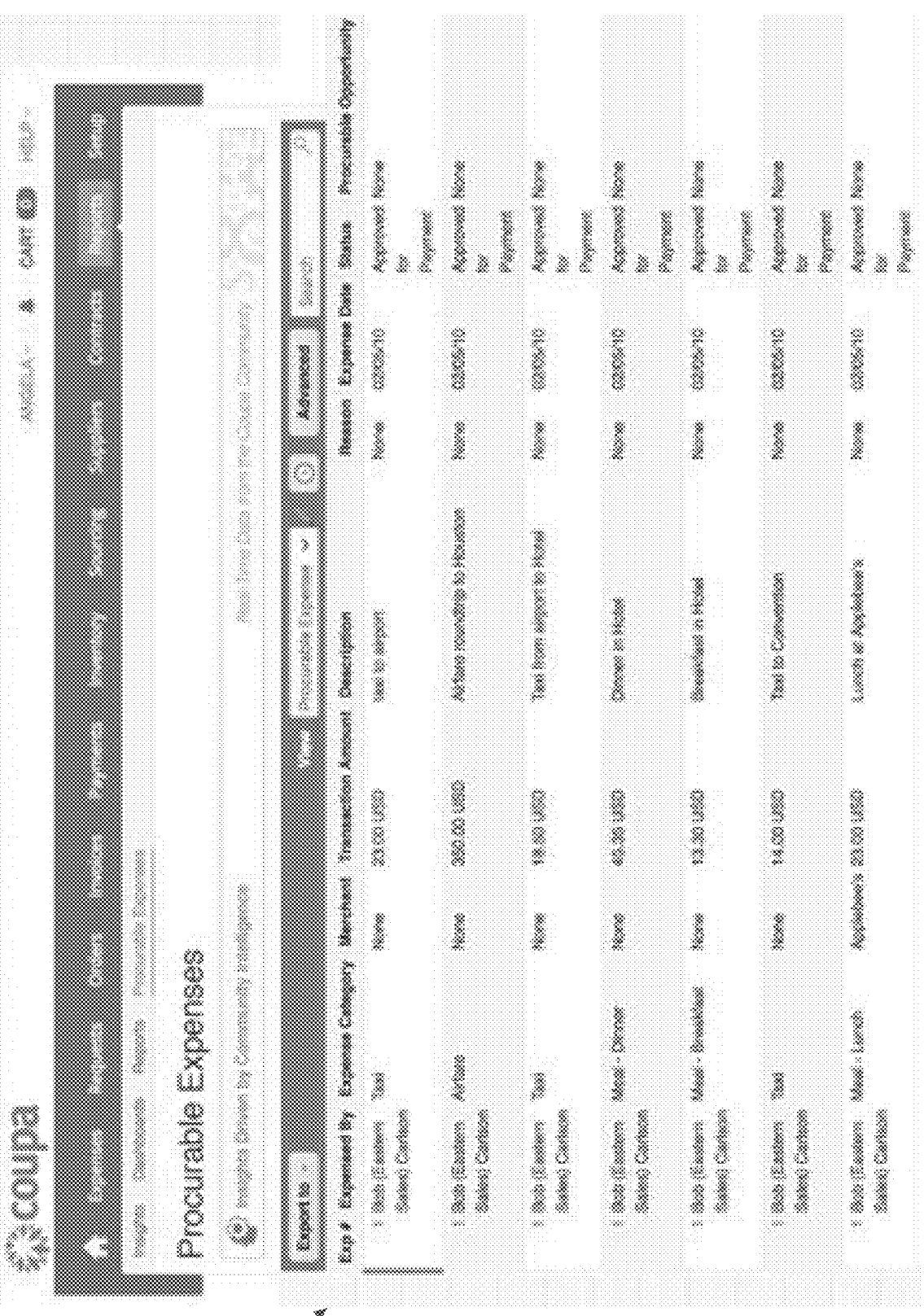
FIG. 5 depicts an example graphical user interface for displaying more detailed information regarding transaction records for all categories.

Similarly, an interface may display past post-approved transaction records that have not been narrowed to a particular category. FIG. 5 depicts an example graphical user interface for displaying more detailed information regarding transaction records for all categories. Thus, interface 500 may comprise similar information for each transaction as interface 400, such as expense category, expense cost, expense date, description, etc.

Figure 6:
FIG. 6 depicts an example graphical user interface for displaying recommendations based on normalized categories of past post-approved transactions.

Server 102 may additionally or alternatively cause display of one or more recommendations based on normalized categories. FIG. 6 depicts an example graphical user interface for displaying recommendations based on normalized categories of past post-approved transactions. The interface 600 may be displayed as part of a graphical user interface depicting transactions for a particular user defined category, such as FIG. 4, and may include recommendations based on the normalized categories for transactions within the particular user defined categories. Recommendations may be displayed with priority given to the normalized category which appears most frequently and/or corresponds to a highest cost in the user defined category. For example, if the user defined category of "Travel" includes 400 procurable expense transactions from a normalized category of "Hotel" and 700 procurable expense transactions from a normalized category of "Flight", the server 102 may display the recommendations for the "Flight" category above recommendations for the "Hotel" category.

In an embodiment, interface 600 comprises recommendations 602, task creation option 604, and action option 606. Recommendations 602 comprise recommendations that correspond to normalize categories and are displayed when greater than a threshold number of transactions and/or transaction cost of a normalized category are identified as procurable transactions that were expensed. Task creation option 604 comprises an option which, if selected, causes the server 102 to create a task object which identifies the recommendation and can be assigned to one or more users. Action option 606 comprises an option which, if selected, causes the server 102 to navigate to a particular page for completing a recommendation, such as navigating to a policy editing page for completing a recommendation of "Update policies". In an embodiment, when a task is completed through the interface, the recommendation is replaced with a recommendation for the category of a lower priority.

In an embodiment, the server 102 additionally provides a cost comparison in a graphical user interface between the past post-approved transaction records and matched past pre-approved transaction records, thereby displaying a difference in cost for performing the transactions as pre-approved transactions instead of post-approved transactions.

In an embodiment, the graphical user interface further depicts expense filtered by submitter. For example, an interface may display a total cost of expense submitted by a particular submitter, a percentage of expenses and/or expense cost from a particular submitter, individual expense transactions submitted that were identified as procurable for an individual submitter, a total cost of expenses that were identified as procurable submitted by the submitter, and/or a percentage of expenses and/or expense cost of expenses identified as procurable submitted by the particular submitter. The graphical user interface may display the expense information for a single submitter and/or for a plurality of submitters. For example, an interface for a plurality of submitters may show the overall costs and/or percentages while an interface for a particular submitter may display individual transactions submitted by the submitter with corresponding information.

In an embodiment, pre-approved transactions may be matched to post-approved transactions at different times during an expensing process. For example, when a past post-approved transaction record is first placed input into an expensing system, the server 102 may determine whether the past post-approved transaction record could have been a pre-approved transaction. If so, the server 102 may cause display of a notification that the input expense transaction was a procurable opportunity. In an embodiment, the server 102 further causes display of an option for confirming that the expense transaction was procurable or indicating that the server 102 incorrectly identified the transaction as procurable, thereby allowing the system to identify past post-approved transactions on an individual basis such that the system can respond faster to future queries. Additionally, the system is able to notify users as an expense transaction is processed, thereby providing a faster correction.

3. Travel Data Implementation

To address and solve the problems identified in the Background concerning travel expense processing, in one embodiment, the system and method previously described can be programmed to identify, generate alerts, and provide views of opportunities to move expense line items representing off-contract travel spending to managed contracts. In an embodiment, a computer-implemented method is programmed to recognize, at an individual level or for an aggregation of multiple individuals, when individuals or employees are booking or incurring travel expenses off-contract, and generate and transmit suggestions for moving future travel booking or expenses on-contract with managed suppliers. If a particular entity or enterprise does not have a contract with a specified supplier, the method can be programmed to identify when other enterprises do have contracts with that supplier, and can help the particular entity or enterprise initiate the contract process.

Figure 10:
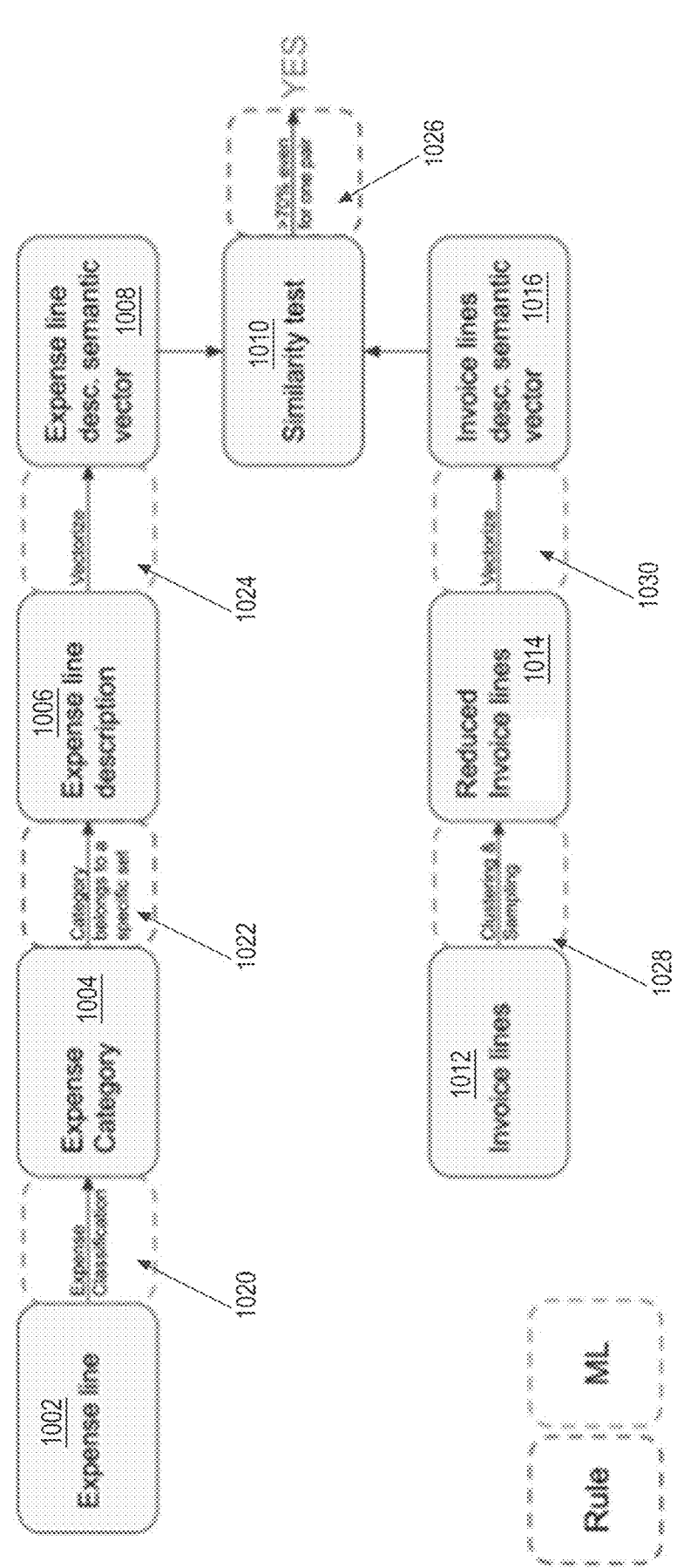
FIG. 10 is a flow diagram that illustrates an alternative embodiment of some aspects and features of FIG. 9.
Figure 11:
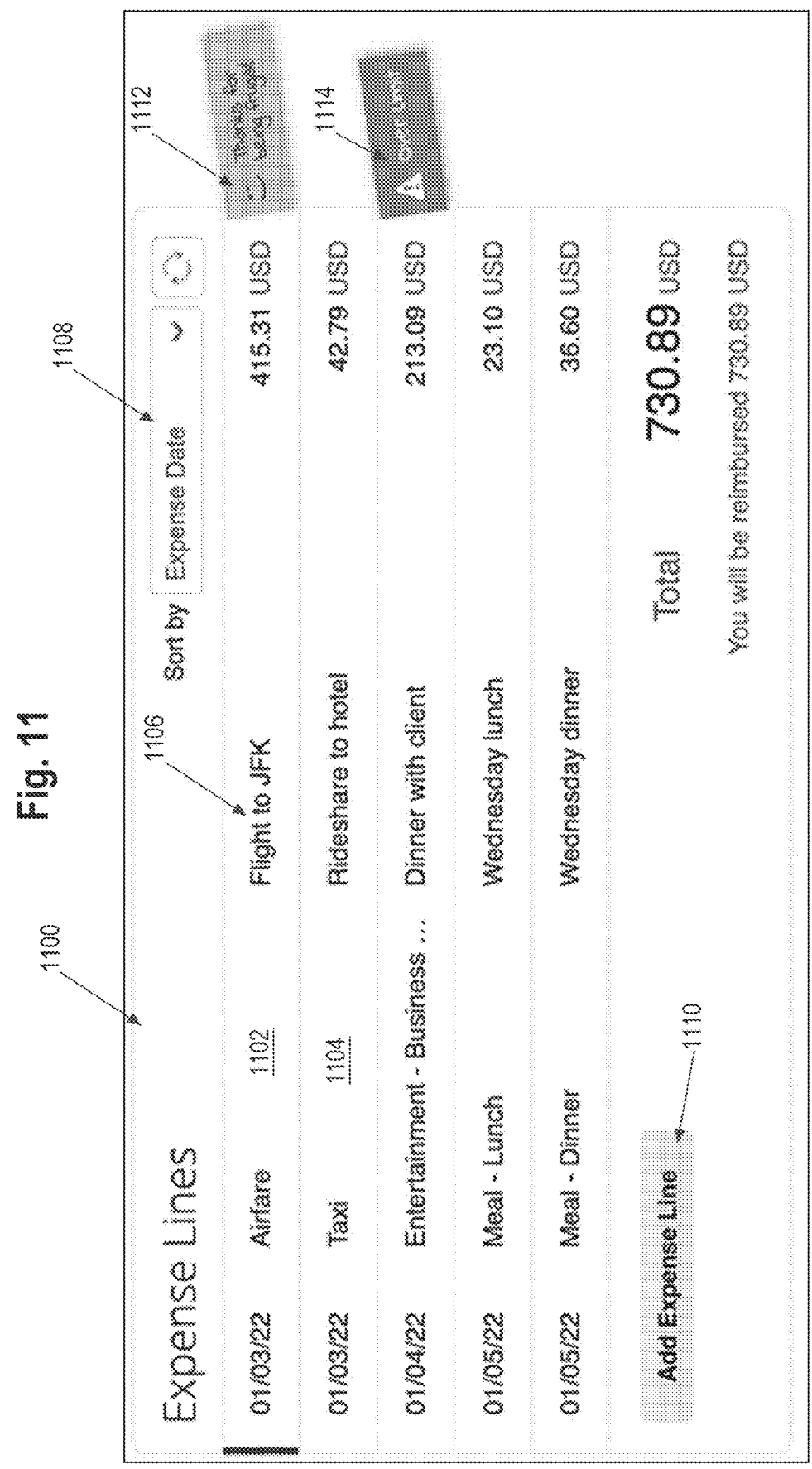
FIG. 11 illustrates an example graphical user interface that a set of expense management instructions could generate and cause rendering via a browser at a first entity computing device, in one embodiment.

FIG. 8 is a block diagram that illustrates an example distributed computing system with which an embodiment can be implemented. FIG. 9 is a flow diagram of a computer-implemented process or algorithm that can be programmed to implement an embodiment. FIG. 10 is a flow diagram that illustrates an alternative embodiment of some aspects and features of FIG. 9. FIG. 11 illustrates an example of a graphical user interface that a set of expense management instructions could generate and cause rendering via a browser at a first entity computing device, in one embodiment. Referring first to FIG. 8, in an embodiment, the first entity computing device 120 and second entity computing device 130 introduced in FIG. 1 are coupled communicatively via network 804 to the server computer 102, which is coupled to an expense management database 830 and contract database 820.

Network 804 broadly represents one or more local area networks, wide area networks, campus networks, internetworks or a combination thereof, using any of satellite or terrestrial links, wired and/or wireless links. In an embodiment, the expense management database 830 can store one or more of the data elements of server 102 of FIG. 1, including, for example, expense lines representing travel expenses such as airfare, rail costs, hotel costs, rental car costs, rideshare service costs, and the like. Contract database 820 comprises a repository of contracts between enterprises and travel service operators, or metadata relating to such contracts. Thus, database 820 is not required to store actual contract documents but, instead, can store representations of contract terms in one or more database tables. In one embodiment, each of the contract database 820 and expense management database 830 is a secure, multi-tenant data repository that stores travel expense data and travel contract data of multiple different enterprises, subject to security controls. Role-based access control, passwords, two-factor authentication, and API keys can be used to ensure that an instance of server 102, accessed by the first entity computing device 120, can access only data in the contract database 820 and expense management database 830 that is associated with the first entity. Conversely, the controls can be programmed for blocking any access to data of the second entity that is associated with the second entity computing device 130. However, the implementation of multi-tenant databases enables the server 102, in responding to the first entity computing device 120, to use the data of a community of users, entities, or enterprises to inform recommendations and programmed processes for that particular user, entity, or enterprise. To support community intelligence, the instruction sets of server 102 can be programmed to execute certain queries against the contract database 820 and expense management database 830 that are not limited to a particular tenant, aggregate the results, and calculate values, responses, or recommendations based on the community of data without disclosing the raw result data to a particular user or entity.

In an embodiment, server 102 hosts and executes a plurality of stored control programs including but not limited to a presentation layer 808, expense management instructions 810, expense insight instructions 812, and a database interface 814. In an embodiment, the presentation layer 808 is programmed to receive programmatic requests from the expense management instructions 810 and/or expense insight instructions 812 to generate displays of data; to generate and format presentation code that can be interpreted or rendered at the first entity computing device 120 and second entity computing device 130, such as dynamic HTML for presentation using browsers; and to receive input in graphical user interfaces and programmatically transfer the input to the expense management instructions 810 and/or expense insight instructions 812.

In an embodiment, the expense management instructions 810 are programmed to facilitate creating, reading, updating, and deleting digital data representing expense lines, in response to input from the first entity computing device 120 and second entity computing device 130, using expense management database 830. For example, the expense management instructions 810 are programmed to interoperate with the presentation layer 808 to generate a graphical user interface in which a user of the first entity computing device 120 and second entity computing device 130 can create expense lines, modify the expense lines, store the expense lines in the expense management database 830, submit a set of expense lines to an approval chain of other computers, and otherwise manage the expense lines.

In an embodiment, the expense insight instructions 812 are programmed to automatically access and read expense lines in the expense management database 830, categorize the expense lines, evaluate the expense lines in relation to records of contracts, and execute responsive actions based on the evaluation. For example, the expense insight instructions 812 are programmed to recognize, at an individual level or for an aggregation of multiple individuals, when individuals or employees are booking or incurring travel expenses off-contract, and generate and transmit suggestions for moving future travel booking or expenses on-contract with managed suppliers.

The database interface 814 is programmed to receive programmatic requests from the expense management instructions 810 and/or expense insight instructions 812 for creating, reading, updating, and deleting digital data in the expense management database 830 and/or contract database 820, to format the requests according to specific programmatic requirements or application programming interfaces of the expense management database 830 and/or contract database 820, to transmit the formatted requests to, and/or call functions of, the expense management database 830 and/or contract database 820. Therefore, the specific systems used for the expense management database 830 and/or contract database 820 can be modified without re-programming or re-deploying the expense management instructions 810 and/or expense insight instructions 812 and by updating only the database interface 814.

Referring now to FIG. 9, in one embodiment, a programmed process 900 initiates execution in response to the first entity computing device 120 and second entity computing device 130 creating one or more new expense lines, modifying an existing expense lines, storing one or more expense lines in the expense management database 830, submitting a set of expense lines to an approval chain, or otherwise requesting reimbursement for expenses represented in the expense lines. The particular trigger condition for initiating execution of process 900 is not critical and the process can be invoked based on a schedule, as a cron job or other scheduled job, or using other means than trigger conditions. What is important is that at some point after an expense line is created, the expense line is subjected to analysis using process 900 to determine whether the expense line is a procurable expense that could have been entered based on the terms of an existing contract of an enterprise.

In an embodiment, at block 902, the process is programmed to access an expense database record comprising an expense line for a travel expense. Block 902 presumes that one of the first entity computing device 120 or second entity computing device 130 has created and stored, updated, or submitted, an expense line for a travel expense, for example, by interacting with expense management instructions 810 to create an expense line in expense management database 830. In response to any trigger condition, schedule, or other initiation condition, block 902 executes a read operation to access, retrieve or read the expense line and all data fields associated with the expense line. Example data fields, attributes, or columns of an expense line can include date, category, description, and amount.

In an embodiment, at block 904, the process is programmed to evaluate the expense line using a machine learning classifier to output and assign a category to the expense line. In some embodiments, block 904 comprises assigning a category and updating the expense line when the expense line has a null value for a category. In other embodiments, block 904 comprises updating an existing category. The term "category," in this context, can be a broad label such as "Airfare" or can be associated with a particular contract of a particular enterprise, such as "Airfare—Acme Airlines Contract Rate 02DF6" where "Acme Airlines" is a travel service provider and "02DF6" is a contract code, product code, service code, or similar. In this manner, determining and applying a category for an expense line enables associating the expense line with a particular contract, or contract provision, or product or service covered under a contract.

In an embodiment, at block 906, the process is programmed to access a table of categories that are procurable with references to related travel contracts. Block 906 recognizes that not all expense lines may be capable of procurement under an enterprise contract rather than incurred as an employee expense. For example, an enterprise could be located in San Mateo, California, with most operations limited to the United States, having an employee who conducted business travel in London, United Kingdom and traveled to a meeting via the London Underground. A category assigned at block 904 might evaluate to "UK subway" or similar, and the enterprise could lack a category with Transport London or have no reason to enter into one. Therefore, using a table of procurable categories provides a foundation to determine whether a particular kind of expense should have been procured under contract. The table referenced in block 906 can be stored in a table schema of either contract database 820 or expense management database 830.

In an embodiment, at block 908, the process is programmed to compare a description field of the expense line to description fields of historic invoice records associated with travel contracts. The description field of an expense line can be one attribute, field, or column value of a database record representing the expense line. FIG. 11 illustrates an example of a graphical user interface 1100 that the expense management instructions 810 could generate and cause rendering via a browser at the first entity computing device 120. In an embodiment, an expense line interface 1100 comprises a plurality of expense lines 1102, 1104, each having a plurality of fields, attributes, or column values. For example, a first expense line 1102 has a date value of "01/02/22", a category of "Airfare", a description 1106 of "Flight to JFK", and an amount of "415.31 USD".

Block 908 can represent creating and programmatically submitting a database search query to the contract database 820 or to an invoice database to retrieve a result set of invoice lines, or vectors representing invoice lines, of past invoices or historic invoices for travel services that travel service providers issued to the enterprise, and that the enterprise received and/or paid, for travel services that could be represented among the expense line of block 902.

Block 908 can be programmed to read the description 1106, "Flight to JFK," and compare that description to historic invoice records associated with travel contracts and/or to contract metadata using such a database query. For example, the contract database 820 or other data repositories of the entity or enterprise may contain records of past invoices, from a service provider such as an airline, from a travel agent, or from an aggregation service or booking service, for other flights to JFK. Matching records of such invoices to the current expense line would indicate that the expense line could have been the subject of a procurement request under the relevant contract rather than an individual employee expense. Furthermore, in the case of a flight, the origin airport can be inferred programmatically from an airport code that is geographically closest to a known city of residence of the user who entered the expense line, or the user's home airport can be stored in configuration data. Records of invoices and invoice lines in the contract database 820 or other data repositories can be pre-processed, or processed at the time of block 906 or block 908, to generate vectors, hash values, or other compact representations of invoice lines for purposes of comparison to expense lines.

In an embodiment, at block 910, the process is programmed to optionally evaluate expense description using a semantic similarity algorithm. For example, the expense description can be processed using programmed similarity methods based on Wordnet, Latent Semantic Analysis (LSA), Latent Dirichlet Allocation (LDA), BLEU, Meteor, Pointwise Mutual Information (PMI), dependency based methods, or optimized methods based on Quadratic Assignment, depending on whether the length of the description and/or terms in relevant contracts suggest using similarity of word to word, sentence to sentence, or bigger texts.

In an embodiment, at block 911, the process is programmed to execute clustering and sampling to reduce the number of historic invoice records for comparison. Block 911 is optional and can be used when contract database 820 stores large number of records. For example, in one actual implementation, a technical challenge of the inventors was to compare every expense line (with more than 10 million expense lines having been entered by a community of users) to every invoice line (with more than 100 million for the community), which led to a number of comparisons on the order of 1,015. A combination of clustering and sampling was used to reduce the number of invoice lines for comparison by 90%.

In an embodiment, at block 912, the process is programmed to test whether the description field of the expense line has a high similarity to a past invoice of the same entity, based on the result of the comparison of block 908. "High" similarity, in block 912, can mean 70% similar or more, in various embodiments; for example, different implementations could use 70%, 75%, 80%, 85%, 87%, 90%, 95%, or other values in the range 70% to 100%.

In an embodiment, at block 914, when the test of block 912 is positive, TRUE, or YES, then the process is programmed to execute a responsive action for the expense line. Block 914 represents a case in which an expense line could have been the subject of a procurement action under a relevant contract. Responsive actions can include, at block 916, programmatically generating a notification or alert to user; at block 918, programmatically marking the expense line; at block 920, automatically initiating a workflow to apply the contract to the expense line. For example, block 916 can comprise generating a text message, email message, or in-application notification to the user. Referring again to FIG. 11, in various embodiments, the process 900 can be programmed to generate and cause updating the interface 1100 to show notifications 1112, 1114, which can comprise positive content ("Thanks for being loyal") or negative content ("Over limit", "Contract should have been used", "Contract discount applies"). Block 918 can comprise updating an expense line record in expense management database 830 with an attribute or column value specifying that the expense line is an out-of-contract expense. The expense management database 830 can implement trigger queries or reports to deliver information on non-contract expense lines to a manager of the user or to a travel manager who sets policies for multiple users, enabling those persons to review policy with the user who submitted the expense line. Or, the marking of the attribute or column can operate to block advancement of the expense line, or expense report of which the expense line is a part, in an approval chain.

Block 920 can be programmed to automatically apply a contract-based discount or other price adjustment to the expense line. In effect, block 920 can automatically impose a penalty on the user for undertaking an individual expensed purchase rather than using the enterprise's contract terms to obtain the product or service represented in the expense line.

FIG. 10 is a flow diagram that illustrates an alternative embodiment of some aspects and features of FIG. 9. In the example of FIG. 10, an expense line 1002 is processed using a machine learning expense classification model 1020 to yield an expense category 1004. Based on a programmed rule, at block 1022, the process of FIG. 10 determines that the expense category 1004 belongs to a specific set. An expense line description 1006 is processed using a vectorize machine learning model 1024 to yield an expense line descriptive semantic vector 1008.

Concurrently, or in a pre-processing stage, a large number of travel service invoice lines 1012 from historic invoices that were generated under contracts for travel services with travel service providers are processed using clustering and sampling, at block 1028, to yield a reduced set of invoice lines 1014. The reduced set of invoice lines 1014 is processed using a vectorize machine learning model 1030, which can be the same model or an adaptation of model 1024, to yield a plurality of invoice lines descriptive semantic vectors 1016.

At block 1010, a similarity test is executed to compare the invoice line vectors of block 1016 to the expense line vectors of block 1008. As shown at block 1026, if the test generates output indicating greater than 70% similarity of even one pair of vectors, then the expense line is deemed procurable and subject to alerting, notification, marking, or other response.

FIG. 11 illustrates an example of a graphical user interface that a set of expense management instructions could generate and cause rendering via a browser at a first entity computing device, in one embodiment. FIG. 11 can represent a graphical user interface that the expense management instructions 810 could generate and cause rendering via a browser at the first entity computing device 120. The expense line interface 110 comprises a plurality of expense lines 1102, 1104, each having a plurality of fields, attributes, or column values. A particular expense line 1102 can include a description 1106. The interface 1100 can be programmed with a sort-by widget 1108, implemented as a pull-down menu to specify different sorting criteria for displaying the expense lines 1102, 1104; in the example of FIG. 11, the expense lines are sorted by date, but another sort ordering can be used. The widget 1108 can be programmed to generate and send a message such as an HTTP POST request to the server 102 in response to a change in the pull-down menu, thereby causing the server to dynamically generate and return updated instructions which can be rendered at a browser of the first entity computing device 120 to yield an updated interface 1100 having a different sorting order for the expense lines 1102, 1104.

The interface 1100 also can be programmed to display notifications 1112, 1114, based upon the state or value of attributes of expense lines in the expense management database 804. For example, the expense management instructions 810 can be programmed to retrieve a set of expense lines for a particular user from the expense management database 830, to read column attributes of each record representing an expense line, and to include, in instructions to presentation layer 808, a notification 1112 if a particular column attribute of a record has a particular marking that is associated with the notification. The interface also can be programmed with an "Add Expense Line" link 1110, button, or widget which, when selected, causes the expense management instructions 810 to instruct the presentation layer 808 to update the interface 1110 with a form to enter data for a new expense line, after which the new expense line is stored as a record in the expense management database 830.

Embodiments can integrate the elements of FIG. 8, the processes of FIG. 9, FIG. 10, and the interface of FIG. 11 into a larger travel and expense program, platform, or solution. For example, the elements, processes, and interface can integrate with travel booking, unified expense management, a mobile application, and traveler support services. They can form one application within a federated e-procurement application that implements other business spend management (BSM) capabilities. With integration to e-procurement, embodiments can provide solutions that avoid wasting hours managing siloed legacy systems as described in the Background. Embodiments also provide spend optimization opportunities that have not been available in the past, by providing the functions described above to easily identify expenses that can be moved onto contracts for future savings. Embodiments can be implemented with services such as COUPA SPEND GUARD, providing continuous AI-based expense fraud detection. An integrated payment service such as COUPA PAY can facilitate rapid reimbursement for out-of-pocket expenses represented in the expense lines noted above, without any dependency on payroll cycles. With the approach of the present disclosure, enterprises that negotiate airline and hotel contracts, for example, can make those contract rates rapidly available to travelers of the enterprise and can audit usage of the rates over time.

Embodiments also integrate community intelligence by interoperating with multi-tenant data repositories that store travel expense data and travel contract data of multiple different enterprises and use the data of a community of users, entities, or enterprises to inform recommendations and programmed processes for a particular user, entity, or enterprise. With community intelligence applied in this manner, customers can measure their performance against critical program KPIs such as platform adoption, expense approval cycle time, and corporate card adoption rate and make improvements with intelligent prescriptions for recommended next steps. Further, the collective power of community spend data enables added travel and expense savings. Embodiments can be programmed to provide access to pre-negotiated private rates with rental car vendors, airlines, and hotels across the world, enabled by the group negotiating power of enterprises' collective spend.

4. Benefits of Certain Embodiments

The systems and methods described herein provide a technical solution to a difficult technical problem of comparing matching post-approved transaction records with a large number of pre-approved transaction records in a manner that saves on processing power and memory by applied machine learning algorithms. Techniques described herein allow records to matched efficiently while reducing a number of comparisons that must be performed and reducing the processing power for performing said comparisons. Examples of technical improvements of the systems and methods described herein include the saving on memory and processing power by utilizing normalization techniques to reduce the number of records for comparison and utilizing clustering algorithms to remove similar records from comparison.

The systems and methods described herein additionally provide practical applications of machine learning systems to match solve the technical problem of matching large number of records to provide a tangible result which identifies procurement opportunities based on past procurements and past expenses. The machine learning systems described herein provide improvements to record matching through computation of similarity values in vectorized record descriptions. Thus, the systems and methods described herein provide a technical solution to a technical problem through the practical application of machine learning systems in a unique manner.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
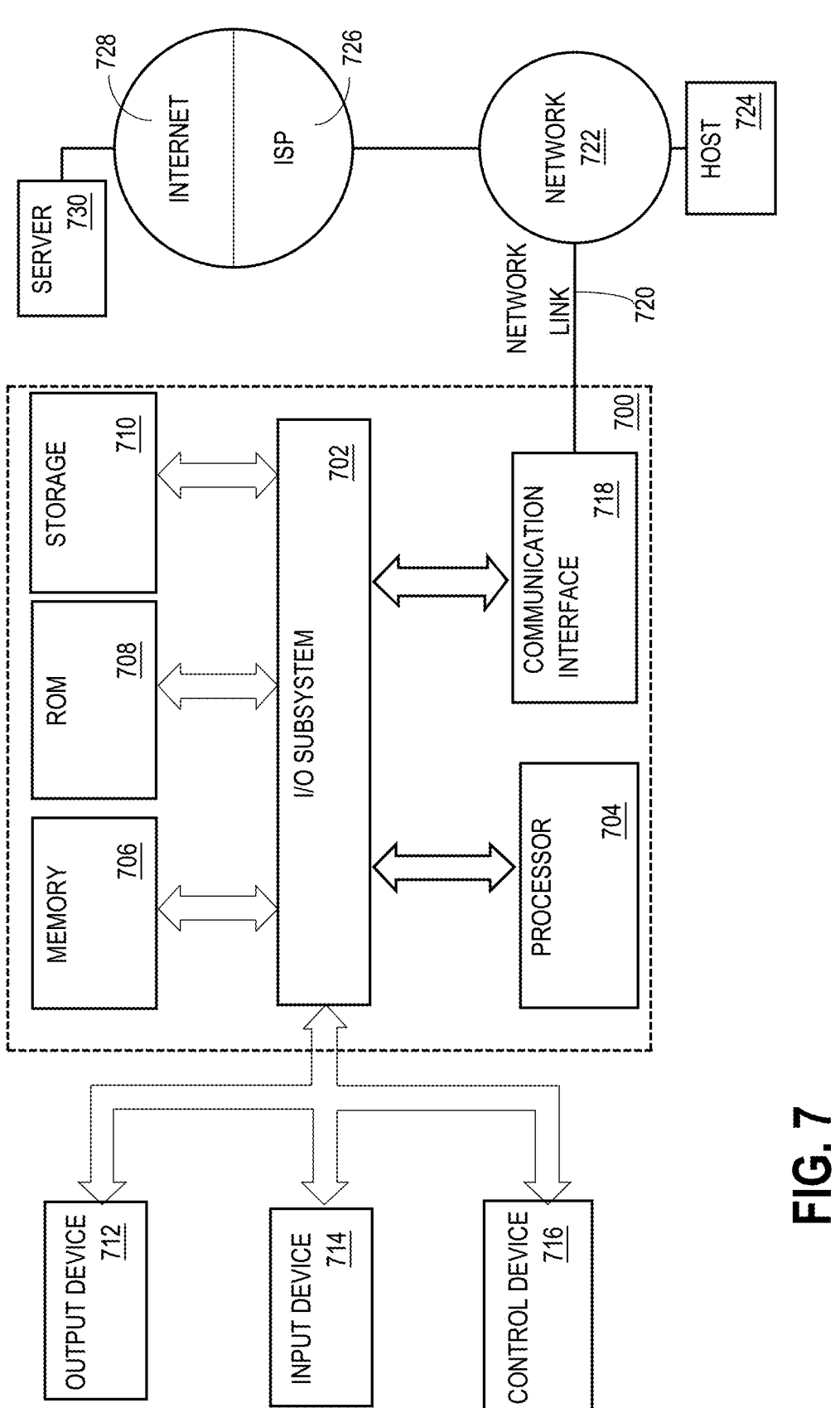
FIG. 7 is a block diagram that illustrates a computer system upon which an embodiment of the disclosure may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
using a server computer executing one or more sequences of expense management instructions and expense insight instructions, the server computer comprising a database interface that is communicatively coupled to a storage device comprising a database:
accessing an expense line for a travel expense for an enterprise, wherein the expense line is a subject of a procurement action under a relevant contract;

using a first machine learning model, determining a category associated with the expense line;
evaluating the expense line using the category associated with the expense line and a table of categories that are procurable with references to related travel contracts;
using a database search query, retrieving from a contract database comprising data relating to travel contracts between travel service providers and the enterprise, historic invoice records associated with the travel contracts;
generating, using a second machine-learning model, an expense line descriptive semantic vector corresponding to the expense line and a plurality of invoice lines descriptive semantic vectors corresponding to the historic invoice records associated with the travel contracts;
evaluating, using a semantic similarity algorithm, a description field of the expense line and description fields of the historic invoice records associated with the travel contracts, wherein evaluating comprises comparing the expense line descriptive semantic vector corresponding to the expense line for the travel expense and the plurality of invoice lines descriptive semantic vectors corresponding to the historic invoice records associated with the travel contracts;
determining, based on comparison between the expense line descriptive semantic vector and the plurality of invoice lines descriptive semantic vectors, a match between the description field of the expense line and the description fields of the historic invoice records associated with travel contracts; and
in response to determining the match, executing a responsive action for the expense line, wherein the responsive action comprises one or more of generating a notification to a first entity computing device, marking the expense line in the database, and initiating a workflow of the server computer to apply the relevant contract to the expense line,
wherein marking the expense line in the database comprises, in response to comparing the expense line descriptive semantic vector and the plurality of invoice lines descriptive semantic vectors and determining the match between the description field of the expense line and the description fields of the historic invoice records associated with travel contracts, updating an expense line record in the database with an attribute or column value specifying that the expense line for the travel expense is an out-of-contract expense.

2. The computer-implemented method of claim 1, further comprising updating the expense line with the determined category when the expense line has a null value for a category.

3. The computer-implemented method of claim 1, further comprising applying clustering and sampling to reduce a number of historic invoice records for comparison.

4. The computer-implemented method of claim 1, wherein the expense line includes date, category, description, and amount.

5. The computer-implemented method of claim 1, wherein the workflow includes applying a contract-based discount or other price adjustment to the expense line.

6. The computer-implemented method of claim 1, further comprising:
retrieving a set of expense lines for a user to read column attributes of each record representing an expense line; and causing displaying, on the first entity computing device, a notification if a particular column attribute of a record has a particular marking that is associated with the notification.

7. The computer-implemented method of claim 1, further comprising:

determining, based on the comparison, whether a similarity between the expense line descriptive semantic vector and the plurality of invoice lines descriptive semantic vectors is greater than a predetermined threshold; and in response to determining that the similarity is greater than the predetermined threshold, validating the expense line to be procurable and subject to alerting, notification, marking, or other response.

8. The computer-implemented method of claim 1, further comprising transmitting the notification using one of: a text message, an email message, and an in-application notification to the first entity computing device.

9. One or more non-transitory computer-readable storage media storing one or more sequences of instructions which, when executed using one or more processors of a server computer, the server computer comprising a database interface that is communicatively coupled to a storage device comprising a database, cause the server computer to perform:

accessing an expense line for a travel expense for an enterprise, wherein the expense line is a subject of a procurement action under a relevant contract;

using a first machine learning model, determining a category associated with the expense line;

evaluating the expense line using the category associated with the expense line and a table of categories that are procurable with references to related travel contracts;

using a database search query, retrieving from a contract database comprising data relating to travel contracts between travel service providers and the enterprise, historic invoice records associated with the travel contracts;

generating, using a second machine-learning model, an expense line descriptive semantic vector corresponding to the expense line and a plurality of invoice lines descriptive semantic vectors corresponding to the historic invoice records associated with the travel contracts;

evaluating, using a semantic similarity algorithm, a description field of the expense line and description fields of the historic invoice records associated with the travel contracts, wherein evaluating comprises comparing the expense line descriptive semantic vector corresponding to the expense line for the travel expense and the plurality of invoice lines descriptive semantic vectors corresponding to the historic invoice records associated with the travel expense;

determining, based on comparison between the expense line descriptive semantic vector and the plurality of invoice lines descriptive semantic vectors, a match between the description field of the expense line and the description fields of the historic invoice records associated with travel contracts; and in response to determining the match, executing a responsive action for the expense line, wherein the responsive action comprises one or more of generating a notification to a first entity computing device, marking the expense line in the database, and initiating a workflow of the server computer to apply the relevant contract to the expense line, wherein marking the expense line in the database comprises, in response to comparing the expense line descriptive semantic vector and the plurality of invoice lines descriptive semantic vectors and determining the match between the description field of the expense line and the description fields of the historic invoice records associated with travel contracts, updating an expense line record in the database with an attribute or column value specifying that the expense line for the travel expense is an out-of-contract expense.

10. The one or more non-transitory computer-readable storage media of claim 9, further comprising sequences of instructions which, when executed using the one or more processors, cause the one or more processors to perform updating the expense line with the determined category when the expense line has a null value for a category.

11. The one or more non-transitory computer-readable storage media of claim 9, further comprising sequences of instructions which, when executed using the one or more processors, cause the one or more processors to perform applying clustering and sampling to reduce a number of historic invoice records for comparison.

12. The one or more non-transitory computer-readable storage media of claim 9, wherein the expense line includes date, category, description, and amount.

13. The one or more non-transitory computer-readable storage media of claim 9, wherein the workflow includes applying a contract-based discount or other price adjustment to the expense line.

14. The one or more non-transitory computer-readable storage media of claim 9, further comprising sequences of instructions which, when executed using the one or more processors, cause the one or more processors to perform retrieving a set of expense lines for a user to read column attributes of each record representing an expense line, and causing displaying, on the first entity computing device, a notification if a particular column attribute of a record has a particular marking that is associated with the notification.

15. The one or more non-transitory computer-readable storage media of claim 9, further comprising sequences of instructions which, when executed using the one or more processors, cause the one or more processors to perform:

determining, based on the comparison, whether a similarity between the expense line descriptive semantic vector and the plurality of invoice lines descriptive semantic vectors is greater than a predetermined threshold; and in response to determining that the similarity is greater than the predetermined threshold, validating the expense line to be procurable and subject to alerting, notification, marking, or other response.

16. The one or more non-transitory computer-readable storage media of claim 9, further comprising sequences of instructions which, when executed using the one or more processors, cause the one or more processors to perform transmitting the notification using one of: a text message, an email message, and an in-application notification to the first entity computing device.

17. A computer system comprising:

one or more processors;

a database interface that is communicatively coupled to a storage device comprising a database;

one or more non-transitory computer-readable storage media coupled to the one or more processors and storing one or more sequences of instructions which, when executed using the one or more processors, cause the one or more processors to perform:

accessing an expense line for a travel expense for an enterprise, wherein the expense line is a subject of a procurement action under a relevant contract;

using a first machine learning model, determining a category associated with the expense line;

evaluating the expense line using the category associated with the expense line and a table of categories that are procurable with references to related travel contracts;

using a database search query, retrieving from a contract database comprising data relating to travel contracts between travel service providers and the enterprise, historic invoice records associated with the travel contracts;

generating, using a second machine-learning model, an expense line descriptive semantic vector corresponding to the expense line and a plurality of invoice lines descriptive semantic vectors corresponding to the historic invoice records associated with the travel contracts;

evaluating, using a semantic similarity algorithm, a description field of the expense line and description fields of the historic invoice records associated with the travel contracts, wherein evaluating comprises comparing the expense line descriptive semantic vector corresponding to the expense line for the travel expense and the plurality of invoice lines descriptive semantic vectors corresponding to the historic invoice records associated with the travel expense;

determining, based on comparison between the expense line descriptive semantic vector and the plurality of invoice lines descriptive semantic vectors, a match between the description field of the expense line and the description fields of the historic invoice records associated with travel contracts; and in response to determining the match, executing a responsive action for the expense line, wherein the responsive action comprises one or more of generating a notification to a first entity computing device, marking the expense line in the database, and initiating a workflow of the computer system to apply the relevant contract to the expense line, wherein marking the expense line in the database comprises, in response to comparing the expense line descriptive semantic vector and the plurality of invoice lines descriptive semantic vectors and determining the match between the description field of the expense line and the description fields of the historic invoice records associated with travel contracts, updating an expense line record in the database with an attribute or column value specifying that the expense line for the travel expense is an out-of-contract expense.

18. The computer system of claim 17, further comprising sequences of instructions which, when executed using the one or more processors, cause the one or more processors to perform updating the expense line with the determined category when the expense line has a null value for a category.

19. The computer system of claim 17, further comprising sequences of instructions which, when executed using the one or more processors, cause the one or more processors to perform applying clustering and sampling to reduce a number of historic invoice records for comparison.

20. The computer system of claim 17, wherein the expense line includes date, category, description, and amount.

21. The computer system of claim 17, wherein the workflow includes applying a contract-based discount or other price adjustment to the expense line.

22. The computer system of claim 17, further comprising sequences of instructions which, when executed using the one or more processors, cause the one or more processors to perform retrieving a set of expense lines for a user to read column attributes of each record representing an expense line, and causing displaying, on the first entity computing device, a notification if a particular column attribute of a record has a particular marking that is associated with the notification.

23. The computer system of claim 17, further comprising sequences of instructions which, when executed using the one or more processors, cause the one or more processors to perform:

determining, based on the comparison, whether a similarity between the expense line descriptive semantic vector and the plurality of invoice lines descriptive semantic vectors is greater than a predetermined threshold; and in response to determining that the similarity is greater than the predetermined threshold, validating the expense line to be procurable and subject to alerting, notification, marking, or other response.

24. The computer system of claim 17, further comprising sequences of instructions which, when executed using the one or more processors, cause the one or more processors to perform transmitting the notification using one of: a text message, an email message, and an in-application notification to the first entity computing device.

* * * * *